United States Patent

Hudson et al.

[15] 3,659,256

[45] Apr. 25, 1972

[54] HYDROPHONE STREAMER CABLE ACOUSTIC DECOUPLER

[72] Inventors: John L. Hudson; Billy H. Towell, both of Houston, Tex.

[73] Assignee: Texaco, Inc., New York, N.Y.

[22] Filed: May 18, 1970

[21] Appl. No.: 38,280

[52] U.S. Cl. ................................................ 340/7, 340/8
[51] Int. Cl. ........................................................ G01v 1/38
[58] Field of Search ........................... 340/7, 8, 9; 181/.5

[56] References Cited

UNITED STATES PATENTS

| | | |
|---|---|---|
| 3,432,000 | 3/1969 | Ongkiehong et al.................340/7 |
| 3,376,948 | 4/1968 | Morrow................................181/.5 |
| 3,371,739 | 3/1968 | Pearson...................................340/7 |
| 3,371,311 | 2/1968 | Cholet et al. ..........................340/7 |
| 3,448,432 | 6/1969 | Watlington.............................340/7 |

*Primary Examiner*—Rodney D. Bennett, Jr.
*Assistant Examiner*—N. Moskowitz
*Attorney*—Thomas H. Whaley and Carl G. Reis

[57] ABSTRACT

The pressure sensing device in a hydrophone streamer cable is compartmentalized between a pair of clamps which are tightened after the hydrophone streamer cable is filled with floatation liquid, thus isolating the pressure sensing device from the floatation liquid outside the compartment.

6 Claims, 6 Drawing Figures

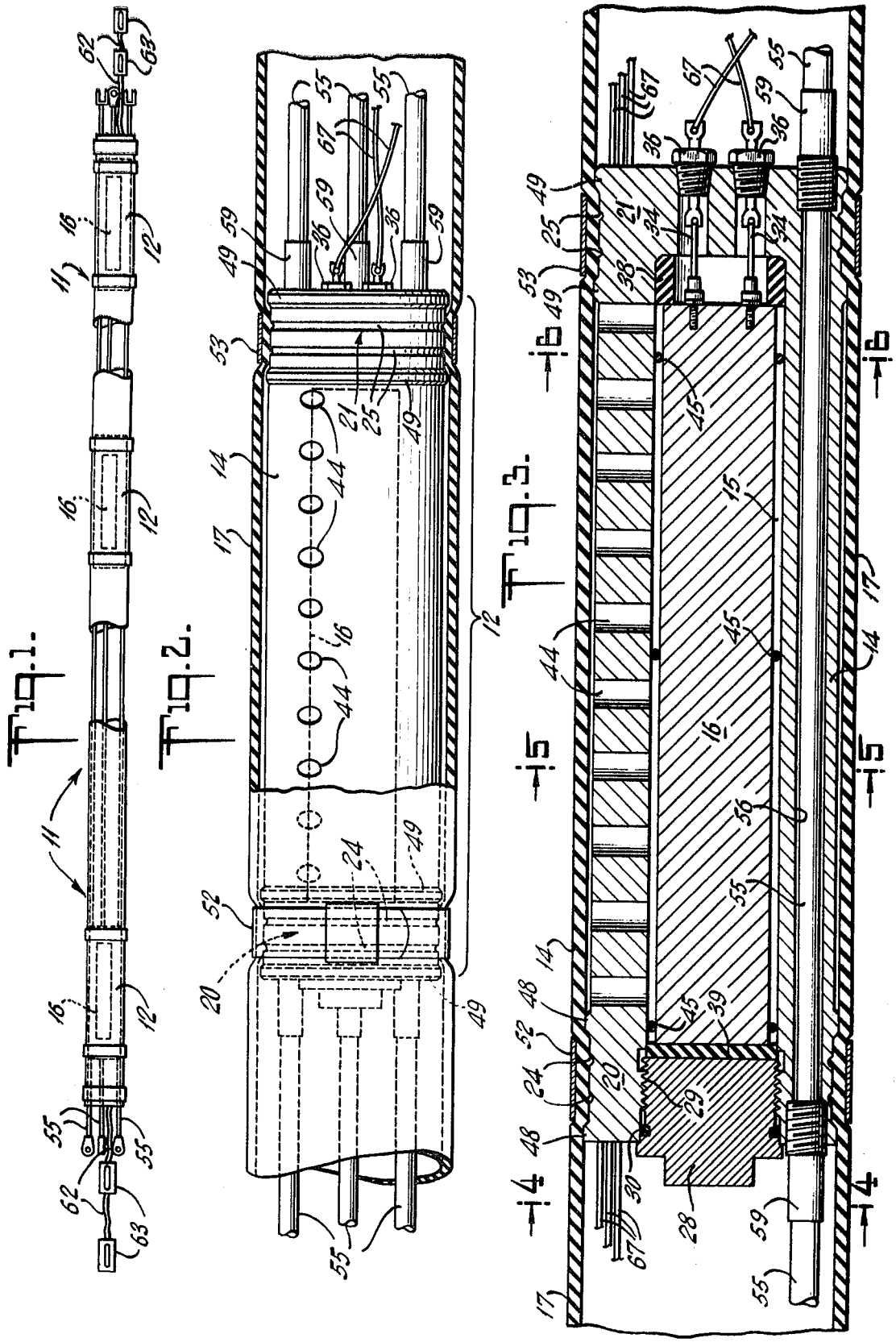

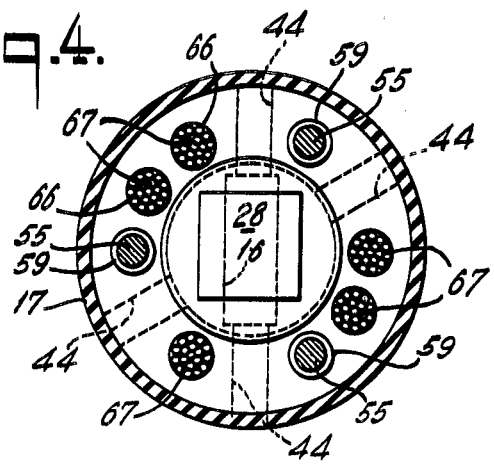
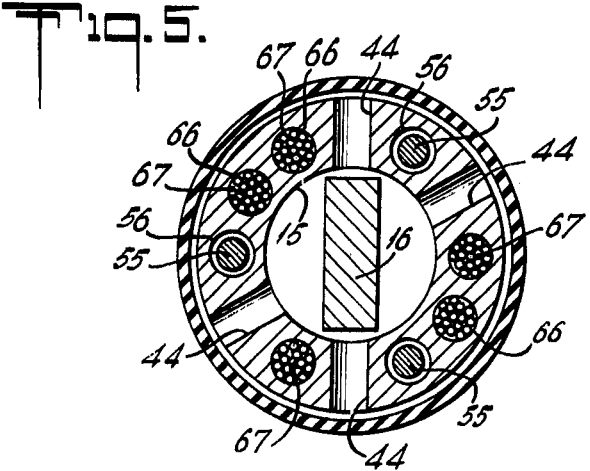
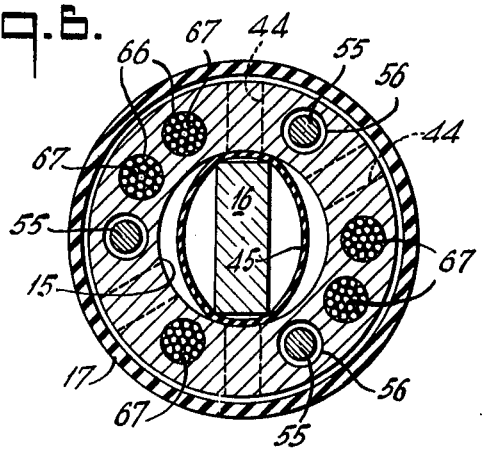

HYDROPHONE STREAMER CABLE ACOUSTIC DECOUPLER

BACKGROUND OF THE INVENTION

This invention relates to a hydrophone streamer cable for use in off-shore seismic operations and more particularly to an acoustic decoupler to decouple the pressure sensing element in a marine hydrophone streamer cable from the main body of oil in the cable.

Hydrophone streamer cables, often of considerable length, are utilized rather extensively in the seismic exploration for off-shore oil deposits. The ordinary cable section is provided with an elastic waterproof exterior cover which encloses a floatation liquid, usually a light hydrocarbon or mineral spirits, and also encloses the electrical sensing devices such as piezoelectric crystal detectors and accompanying wiring. The enclosed floatation liquid provides the hydrophone streamer cable with stabilized neutral salt-water-buoyance which allows the hydrophone streamer cable to be trailed at a predetermined depth within the water in which seismic operations are being carried out.

Pressure sensing elements provided in each section of the hydrophone streamer cable are extremely sensitive to pressure. The pressure sensing elements are commonly suspended in the floatation liquid in the cable, and pressure waves are generated in this floatation liquid when the cable is jerked or pulled. Because of the sensitivity of these pressure sensing elements, the slightest pressure wave generates a signal which is transmitted to the seismic amplifier as an electrical noise which ultimately appears on the seismic record.

SUMMARY OF THE INVENTION

In accordance with the present invention, there is described a hydrophone cable construction comprising a plurality of active and dead cable sections, each active section including a plurality of sub-assemblies for housing pressure sensing elements, each of the sub-assemblies with its pressure sensing elements being compartmentalized within the cable section by a constricting means on either side thereof enclosing and compressing a narrow band of the elastic waterproof exterior cover upon said sub-assemblies whereby floatation liquid in the cable section is prevented from passing pressure waves therethrough in the area of the pressure sensing element.

It is a general object of the present invention to produce a new and improved hydrophone cable section of the character described in the preceding paragraph.

It is a more specific object of the present invention to provide a hydrophone streamer cable section wherein the pressure sensing elements therein are acoustically decoupled from the main body of floatation liquid in the hydrophone steamer cable section.

It is an additional object of the present invention to provide a hydrophone streamer cable section having each of its pressure sensing elements compartmentalized therein.

These and other objects of the present invention will become apparent from the following detailed description, taken in conjunction with the accompanying drawings, wherein the invention will be further understood by reference thereto.

BRIEF DESCRIPTION OF THE DRAWINGS

The accompanying drawing represents preferred forms of the invention, wherein:

FIG. 1 is an elevational view of a hydrophone active cable unit;

FIG. 2 is an enlarged elevation, partly broken away in cross section showing a single hydrophone active cable section;

FIG. 3 is an enlarged vertical longitudinal sectional view of the same cable section as FIG. 2;

FIG. 4 is a transverse cross section taken along the line 4—4 of FIG. 3, looking in the direction of the arrows;

FIG. 5 is another transverse cross section taken along the line 5—5, looking in the direction of the arrows; and FIG. 6 is still another transverse cross section, taken along the line 6—6 and looking in the direction of the arrows.

DESCRIPTION OF THE PREFERRED EMBODIMENT

In brief, the invention may be described as being one in combination with a hydrophone streamer cable that has a plurality of longitudinally spaced hydrophone sections filled with a floatation liquid. It concerns the improvement that comprises an elongated body of rigid protective material at each of said hydrophone sections, and pressure sensing means mounted in a cavity in said elongated body in direct seismic wave communication with said floatation liquid. The improvement also comprises a pair of restricting means one at each end of said elongated body to prevent the communication of said floatation liquid across the said ends in order to cut off direct seismic wave energy paths in said floatation liquid along the length of said streamer.

While this invention is susceptible of embodiment in many different forms, there is shown in the drawings and will herein be described in detail a specific embodiment of the invention with the understanding that the present disclosure is to be considered as an exemplification of the principles of the invention and is not intended to limit the invention to the embodiment illustrated. The scope of the invention will be pointed out in the appended claims.

Referring now to the drawings, there is shown in FIG. 1 a hydrophone active cable unit 11. A typical active cable unit 11 may be from 100 to 240 feet long and the entire hydrophone cable is made up of a plurality of active units and dead sections (not shown), each approximately 100 to 250 feet long. There may be some 70 or more active units and dead sections in each complete cable thereby providing an over-all length in excess of 1 mile. In a complete hydrophone cable which employs the type of active units shown in FIG. 1, there are normally about 24 active cable units plus approximately 50 dead sections, making a total in all of 70 or more.

FIG. 1 shows an abbreviated version of an active unit, since the typical unit is quite long as indicated above and may have as many as 20 or more hydrophone sections 12 in each active cable unit 11. Each hydrophone section 12 has located therein a pressure sensing means 16. These are commonly known as seismic detectors and might take various forms, e.g. like a commercial unit manufactured by Mark Products, Inc. of Houston, Texas designated Model P-24, or like some of the modifications suggested in the U.S. Pat. to Gallaway et al., No. 3,336,573.

Thus, there may be one or more individual detectors at each hydrophone section 12 and the detectors in an active cable unit 11 may be connected electrically in parallel, in series, or in series parallel.

Also, at each hydrophone section 12 there is cylindrical shaped body 14. This is made of a rigid material which may be constructed by being molded, cast or machined. It is preferably a light weight rigid plastic or metal.

Body 14 has a cavity 15 which houses the seismic detectors, i.e. pressure sensing means 16. This arrangement protects the detectors against rough handling while permitting a direct seismic energy connection with the surrounding medium via a floatation liquid contained in the cavity 15 and surrounding the body 14.

The active cable unit 11 has a flexible tube 17 extending the whole length of the unit. This tube or outer jacket 17 is waterproof and has an inside diameter somewhat greater than the outside diameter of the bodies 14. Also, it is filled with floatation liquid in the conventional manner for hydrophone streamer cables. Consequently, the floatation depth of the hydrophone streamer cable may be determined by the choice of floatation fluid. For ocean going seismic work, the cable assembly can be made to float at any desired depth by choosing a fluid with a density less than seawater such that when filled the cable density will be equal to that of seawater at a desired depth.

At each hydrophone section 12, the whole column of floatation liquid inside the tube 17 is restricted at each end of the section, i.e. at the ends of the body 14. This cuts off any direct seismic energy path in the floatation liquid and so stops the generation of undesirable noise on the seismic record that tends to be generated by flexing etc. as the cable is jerked or pulled.

The restricting means at the ends of each body 14 include solid, spool shaped ends 20 and 21 that each have a pair of annular grooves 24 and 25 respectively, spaced axially apart and acting to help ensure a liquid tight seal with the adjacent wall of the tube 17.

The cavity 15 is closed at both ends by having one end closed by a solid plug 28 that is threaded into the end 20 of body 14 by threads 29 as shown in FIG. 3. There may also be an O-ring seal 30, as indicated.

The other end of the cavity is closed even though there are holes for carrying electrical circuit wires 34 out from the detector unit 16. This is accomplished by having conventional electrical connector plugs 36 filling the holes.

The sensitive pressure sensing seismic detector unit 16 is shock mounted in the cavity 15 by having an annular cushion 38 at the same end as the circuit wires 34, while at the other end there is a flat disc shaped cushion 39 that fits between the plug 28 and the detector unit 16. It is also in direct seismic wave communication with the floatation liquid that fills the cavity 15 and then transmits seismic waves via the walls of the flexible tube 17 to the surrounding body of water. These are radially directed paths of direct seismic energy transmittal, and they are facilitated by having a series of holes 44 extending radially through the body 14 in rows spaced longitudinally of the body. The shock mounting may be completed by having three O-rings 45 surrounding the detector unit 16 and spaced at intervals therealong.

It will be observed that the spool shaped ends 20 and 21 each have flanges 48 and 49 respectively. These act in cooperation with a pair of clamping straps 52 and 53 which are only as wide as the space between the flanges. The straps are applied outside of the flexible tube 17 and are drawn tightly around the solid ends of the body 14. In this manner a liquid tight seal is created at each end of the body. The seal is enhanced by the grooves 24 and 25 in the ends, into which the flexible material of tube 17 is pressed.

It will be appreciated that because of the length of a hydrophone streamer cable, there is need for stress members to carry the physical strain as the streamer is towed through the water. In the present embodiment, three stress members 55 are shown spaced approximately 120° apart. Three conduits 56 extend longitudinally through each of the bodies 14 for having the stress members 55 pass therethrough.

A pair of sleeves 59 are disposed at opposite ends of the body 14 for each conduit 56. These, of course, have one of the stress members 55 passing therethrough. One end of each sleeve 59 is externally threaded to mate with one of the tapped ends of the conduit 56. In this manner, after each stress member 55 is passed through the conduit 56 with the sleeves 59 screwed tightly in place, the unthreaded portion or free end of each sleeve 59 is crimped tightly onto the stress member 55. Consequently, the sleeves act to transmit the mechanical load from the body 14 to the stress members 55 and vice versa. This helps maintain desired seismic energy isolation of the detector unit 16 from the seismic noise generated along the streamer cable.

It will be appreciated that there are electrical conductors extending along the streamer cable for making the desired connections to carry the signals generated by the detector units 16. Wires for making up these conductors are shown schematically in FIG. 1 as a cable 62 which extends from the ends of the active cable unit 11. These have electrical connectors 63 for connecting with similar cables (not shown) in the adjoining dead sections (not shown).

At each hydrophone section 12 there are a plurality of holes 66 that extend longitudinally through the body 14. These provide for passing wires 67 internally along the streamer without effecting the seismic energy isolation at each hydrophone section.

While a particular embodiment of the invention has been described above in considerable detail in accordance with the applicable statutes, this is not to be taken as in any way limiting the invention but merely as being descriptive thereof.

We claim:

1. In combination with a hydrophone streamer cable having a plurality of longitudinally spaced hydrophone sections filled with a floatation liquid, the improvement comprising
   an elongated cylindrical body of rigid protective material at each of said hydrophone sections,
   said body having spool shaped solid ends,
   pressure sensing means mounted in a cavity in said elongated body, in direct seismic wave communication with said floatation liquid,
   said streamer cable comprising a flexible tube surrounding said hydrophone sections, and
   a pair of straps applied around the body at said spool shaped ends to clamp said flexible tube into liquid tight sealing contact with said solid ends in order to cut off direct seismic wave energy paths in said floatation liquid along the length of said streamer.

2. The invention according to claim 1 wherein said spool shaped ends have at least one annular groove around the body of each for improving the liquid tight seals.

3. The invention according to claim 2 wherein said elongated body includes a plurality of transverse passageways for connecting said cavity with the outside of said body to provide acoustic coupling through said floatation liquid to said pressure sensing means.

4. The invention according to claim 3 wherein said straps are metal.

5. The invention according to claim 3 wherein said straps are plastic.

6. In combination with a hydrophone streamer cable having a plurality of longitudinally spaced hydrophone sections filled with a floatation liquid, the improvement comprising
   an elongated cylindrical body of rigid protective material at each of said hydrophone sections,
   at least one pressure sensitive geophone mounted in a cavity in said body,
   said body having a plurality of transverse holes connecting said cavity with the outside thereof to permit free communication of said floatation liquid,
   a pair of solid spool shaped ends on said elongated body each having flanges and a pair of annular grooves therebetween,
   said streamer cable comprising a flexible tube having an inside diameter greater than the outside diameter of said body, and
   a pair of clamping straps outside of said flexible tube and located one at each of said spool shaped ends and drawn tightly around the said pair of annular grooves for creating liquid tight seals to prevent direct transmission of seismic wave energy longitudinally around said ends.

* * * * *